US006852031B1

(12) United States Patent
Rowe

(10) Patent No.: US 6,852,031 B1
(45) Date of Patent: Feb. 8, 2005

(54) EZ PAY SMART CARD AND TICKETS SYSTEM

(75) Inventor: Richard E Rowe, Reno, NV (US)

(73) Assignee: IGT, Reno, NV (US)

( * ) Notice: Subject to any disclaimer, the term of this patent is extended or adjusted under 35 U.S.C. 154(b) by 443 days.

(21) Appl. No.: 09/718,974

(22) Filed: Nov. 22, 2000

(51) Int. Cl.$^{7}$ .......................... A63F 13/00; A63F 9/24; G06F 17/00; G06F 19/00; A63B 71/00

(52) U.S. Cl. .............................. 463/29; 463/1; 463/25; 463/43; 463/47; 273/138.1; 273/138.2; 273/139; 273/148 R; 235/375; 235/380

(58) Field of Search ...................... 463/1, 9, 10, 16–21, 463/25–30, 40–47; 273/138.1, 139, 138.2, 148 R, 148 B; 235/375, 379, 380, 493

(56) References Cited

U.S. PATENT DOCUMENTS

| | | | | | |
|---|---|---|---|---|---|
| 4,575,621 | A | * | 3/1986 | Dreifus | 235/380 |
| 4,764,666 | A | * | 8/1988 | Bergeron | 463/25 |
| 4,768,151 | A | * | 8/1988 | Birenbaum et al. | 463/19 |
| 4,856,787 | A | | 8/1989 | Itkis | |
| 5,061,845 | A | | 10/1991 | Pinnavaia | |
| 5,129,652 | A | | 7/1992 | Wilkinson | 273/139 |
| 5,179,517 | A | * | 1/1993 | Sarbin et al. | 463/25 |
| 5,265,874 | A | | 11/1993 | Dickinson et al. | 273/138 |
| 5,557,086 | A | | 9/1996 | Schulze et al. | 235/380 |
| 5,613,911 | A | * | 3/1997 | Takemoto et al. | 463/25 |
| 5,628,685 | A | * | 5/1997 | Takemoto et al. | 463/25 |
| 5,643,086 | A | | 7/1997 | Alcorn et al. | 463/29 |
| 5,752,882 | A | * | 5/1998 | Acres et al. | 463/42 |
| 5,761,647 | A | | 6/1998 | Boushy | 705/10 |
| 5,768,382 | A | | 6/1998 | Schneier et al. | 380/23 |
| 5,871,398 | A | | 2/1999 | Schneier et al. | 463/16 |
| 5,967,896 | A | | 10/1999 | Jorasch et al. | 463/25 |
| 6,019,283 | A | | 2/2000 | Lucero | 235/380 |
| 6,068,552 | A | * | 5/2000 | Walker et al. | 463/21 |
| 6,104,815 | A | | 8/2000 | Alcorn et al. | 380/251 |
| 6,106,396 | A | | 8/2000 | Alcorn et al. | 463/29 |
| 6,110,041 | A | * | 8/2000 | Walker et al. | 463/20 |
| 6,149,522 | A | | 11/2000 | Alcorn et al. | 463/29 |
| 6,165,071 | A | * | 12/2000 | Weiss | 463/24 |
| 6,254,006 | B1 | | 7/2001 | Mish | 235/492 |
| 6,284,406 | B1 | * | 9/2001 | Xing et al. | 429/96 |
| 6,431,983 | B2 | | 8/2002 | Acres | 463/25 |
| 6,439,996 | B2 | * | 8/2002 | LeMay et al. | 463/29 |
| 6,564,995 | B1 | * | 5/2003 | Montgomery | 235/379 |
| 6,564,997 | B1 | * | 5/2003 | Juds | 235/382 |
| 6,579,185 | B1 | * | 6/2003 | Honda et al. | 463/43 |
| 6,582,311 | B1 | * | 6/2003 | Sugimura | 463/43 |

FOREIGN PATENT DOCUMENTS

| | | | |
|---|---|---|---|
| EP | 0 360 613 | 3/1990 | G07F/17/34 |
| EP | 1 139 310 A2 | 4/2001 | G07F/17/32 |
| WO | WO 95/24689 | 9/1995 | |
| WO | WO 96/00950 | 1/1996 | |
| WO | WO 97/19537 | 5/1997 | |

* cited by examiner

*Primary Examiner*—A. L. Wellington
*Assistant Examiner*—Binh-An D. Nguyen
(74) *Attorney, Agent, or Firm*—Beyer, Weaver & Thomas LLP

(57) ABSTRACT

A disclosed smart card includes a processor and memory configured to execute a number of gaming applications, such as a bonus game application, a progressive game application, a voucher application and a paytable application, and communicate with a master gaming controller on the gaming machine. Gaming instructions, generated during the execution of one or more of the gaming application on the smart card, may be used to affect game play on the gaming machine. The gaming instructions for various gaming services may be supplied to gaming machines operating in a "stand alone" mode or gaming machine connected to some type of dedicated network. In addition, the smart card may store game components including audio game components and video game components that may be downloaded into a gaming machine and incorporated into a game presentation on the gaming machine. The smart card may be utilized at many different venues including casinos, hotels, bars, restaurants and retail stores.

25 Claims, 7 Drawing Sheets

EZ PAY SMART CARD AND TICKETS SYSTEM

BACKGROUND OF THE INVENTION

This invention relates to game playing services for gaming machines such as slot machines and video poker machines. More particularly, the present invention relates to methods of utilizing smart cards on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

The operations described above may be carried out on the gaming machine when the gaming machine is operating as a "stand alone" unit or linked in a network of some type to a group of gaming machines. As technology in the gaming industry progresses, more and more gaming services are being provided to gaming machines using a client-server model. In a client-server model, groups of gaming machines are linked via a dedicated communication network of some type to a remote computer that provides one or more gaming services using the dedicated communication network. These gaming services provided by the remote computer over the dedicated communication network may be referred to as "network gaming services." As an example, network gaming services that may be provided by a remote computer to a gaming machine via a dedicated communication network of some type include player tracking, accounting, cashless award ticketing, lottery games, progressive games and bonus games.

Typically, network gaming services enhance the game playing capabilities of the gaming machine or provide some operational advantage in regards to maintaining the gaming machine. Thus, network gaming services provided to groups of gaming machines linked over a dedicated communication network of some type have become very popular in the gaming industry. To justify the costs associated with the infrastructure needed to provide network gaming services on a dedicated communication network, a certain critical number of gaming machines linked in a network of some type must utilize the service. Thus, many of the network gaming services are only provided at larger gaming establishments where a large number of gaming machines are deployed.

A progressive game network offering progressive game services is one example where a group of gaming machines are linked together using a dedicated network to provide a network gaming service. The progressive game services enabled by the progressive game network increase the game playing capabilities of a particular gaming machine by enabling a larger jackpot than would be possible if the gaming machine was operating in a "stand alone" mode. The potential size of the jackpot increases as the number gaming machines connected in the progressive network is increased. The size of the jackpot tends to increase game play on gaming machines offering a progressive jackpot which out weighs the costs associated with installing and maintaining the dedicated progressive game network and the dedicated progressive game server.

In the gaming industry, a current barrier to providing network gaming services is the complexity and costs of the dedicated communication networks and servers associated with deploying a network gaming service using a client-server model. The costs of installing and maintaining a dedicated communication network and dedicated server typically limit the application of network gaming services to large establishments with a large number of gaming machines. In smaller establishments, the cost of a dedicated communication network and a server to provide a network gaming service for a small number of gaming machines is usually not justified. For instance, when a small number of gaming machines are leased to a store, the gaming machines typically operate in a "stand alone" mode. While operating in "stand alone" mode, network gaming services are not available to these gaming machines. Further, even in the larger establishments, a gaming operator may be reluctant to implement a new network gaming services because the costs of deployment using a client-server model is high while the benefits of the new network gaming service may not become clear until after the new service is deployed. In view of the above, it would be desirable to provide network gaming service deployment methods for gaming machines that reduce the costs associated with installing and performing network gaming services.

SUMMARY OF THE INVENTION

This invention addresses the needs indicated above by providing a smart card with a processor and memory configured to execute a number of gaming applications, such as a bonus game application, a progressive game application, a voucher application and a paytable application, and communicate with a master gaming controller on a gaming machine. Gaming instructions, generated during the execution of one or more of the gaming application on the smart card, may be used to affect game play on the gaming machine. The gaming instructions for various gaming services may be supplied to gaming machines operating in a "stand alone" mode or gaming machine connected to some type of dedicated network. In addition, the smart card may store game components including audio game components and video game components that may be downloaded into a gaming machine and incorporated into a game presentation on the gaming machine. The smart card may be utilized at many different venues including casinos, hotels, bars, restaurants and retail stores.

One aspect of the present invention provides a smart card for performing gaming services. The smart card may be generally characterized as including: 1) a card substrate; 2) an interface located on the substrate for communicating with a master gaming controller of a gaming machine; 3) a processor and a memory located on the substrate and configured to execute one or more of the following gaming applications: i) a bonus game application, ii) a progressive game application, iii) a voucher application allowing a player to cash out a certain amount of wjnlnings, and iv) a paytable application for selecting a particular paytable from among a plurality of paytables. In addition, the processor and memory may be configured to execute one or more of the following game applications; a bingo bonus game application, and a lottery game application, a keno game application, a pull tab game application and a bingo progressive game application.

In particular embodiments, the processor may be a micro-controller having firmware or a general purpose microprocessor. The memory may be a flash memory where the memory stores one or more of player tracker information, loyalty points, paytables, game components, game play history information, bonus game information, progressive game information and voucher information. The smart card may be adapted to be accepted at multiple venues where at least one of the vouchers and loyalty points are transferable across venues such as casinos, hotels, restaurants, retail stores and bars.

Another aspect of the present invention provides a gaming machine for executing a game play with the aid of a smart card. The gaming machine may be generally characterized as including: 1) a master gaming controller designed or configured to present a game on the gaming machine using (a) gaming instructions generated by a processor on the smart card and (b) gaming instructions resident on the master gaming controller; and 2) a smart card reader providing a communication interface between the smart card and the master gaming controller. The gaming instructions generated by a processor on the smart card may specify a progressive game, a bonus game or a paytable that affects a game presentation on the gaming machine. The game in the game presentation may be a video black jack game, a video slot game, a mechanical slot game, a video poker game, a video keno game, a video pachinko game, video card game or any other type of game presented on a gaming machine.

In particular embodiments, the gaming machine may also include a network communication interface where the smart card communicates with a game service server, such as an accounting server, a bonus game server, a progressive server, a player tracking server and a cashless system server, using the network communication interface. The gaming machine may also include a speaker where the speaker outputs audio components stored in a memory on the smart card and a graphical display where the graphical display outputs graphical components stored in a memory on the smart card.

Another aspect of the present invention provides a method in a gaming machine for executing a game play on the gaming machine with the aid of a smart card. The method may be generally characterized as including: 1) receiving a signal indicating a smart card has been inserted in a smart card reader on the gaming machine; 2) establishing communications with the smart card; 3) receiving gaming instructions from one or more gaming applications executed by a processor on the smart card; and 4) presenting a game play on the gaming machine using the gaming instructions from the smart card and using gaming instructions generated by a master gaming controller resident on the gaming machine. In addition, the method may include one or more of the following: a) authenticating the smart card, b) receiving a list of gaming applications available on the smart card from the smart card, c) selecting a gaming application from the list of gaming applications and requesting the smart card to execute the selected gaming application, d) sending gaming machine identification information to the smart card, e) in response to the gaming instruction received from the smart card, communicating with a remote game server, f) sending game play information to the smart card, g) downloading a gaming application stored on the smart card and executing the gaming application on the gaming machine and h) downloading a game stored on the smart card and executing the game on the gaming machine. In a particular embodiment, the gaming instructions may include one or more of player tracking information, loyalty points, paytables, game components, game configuration information, a game play history, progressive game information, bonus game information and voucher information, where the game components may include a graphical game component and an audio game component and where the game configuration information may include a game type, a game version, a game background, a game denomination and a game wager amount.

Another aspect of the present invention provides a method in a smart card for executing a game play on a gaming machine with the aid of the smart card. The method may be generally characterized as including: 1) receiving a signal indicating the smart card has been inserted in a smart card reader; 2) establishing communications with the gaming machine; 3) determining that a gaming application is to be executed by the smart card; 4) executing said gaming application using a processor on the smart card; and 5) sending gaming instructions generating during execution of the gaming application to the gaming machine where the gaming instructions are used to present a game play on the gaming machine. The gaming instructions may include player tracker information, loyalty points, paytables, game component information, game configuration information, game play history information, bonus game information, progressive game information and voucher information. In addition, the method may include one or more of the following: a) sending a list of gaming applications available on the smart card to the gaming machine, b) sending authentication information to the gaming machine, c) receiving gaming machine identification information from the gaming machine, such as a gaming machine identifier and a list of gaming applications supported by the gaming machine, d) receiving game play information from the gaming machine, e) establishing communications with a game service server, such as a an accounting server, a bonus game server, a progressive server, a player tracking server or a cashless system server, using a communication interface residing on the gaming machine and communicating with the game service server. In a particular embodiment, the smart card may be adapted to be accepted at multiple venues, such as casinos, hotels, restaurants, retail stores and bars, where at least one of the vouchers and loyalty points are transferable across the venues.

These and other features of the present invention will be presented in more detail in the following detailed description of the invention and the associated figures.

DESCRIPTION OF THE PREFERRED EMBODIMENTS

Figure 1:
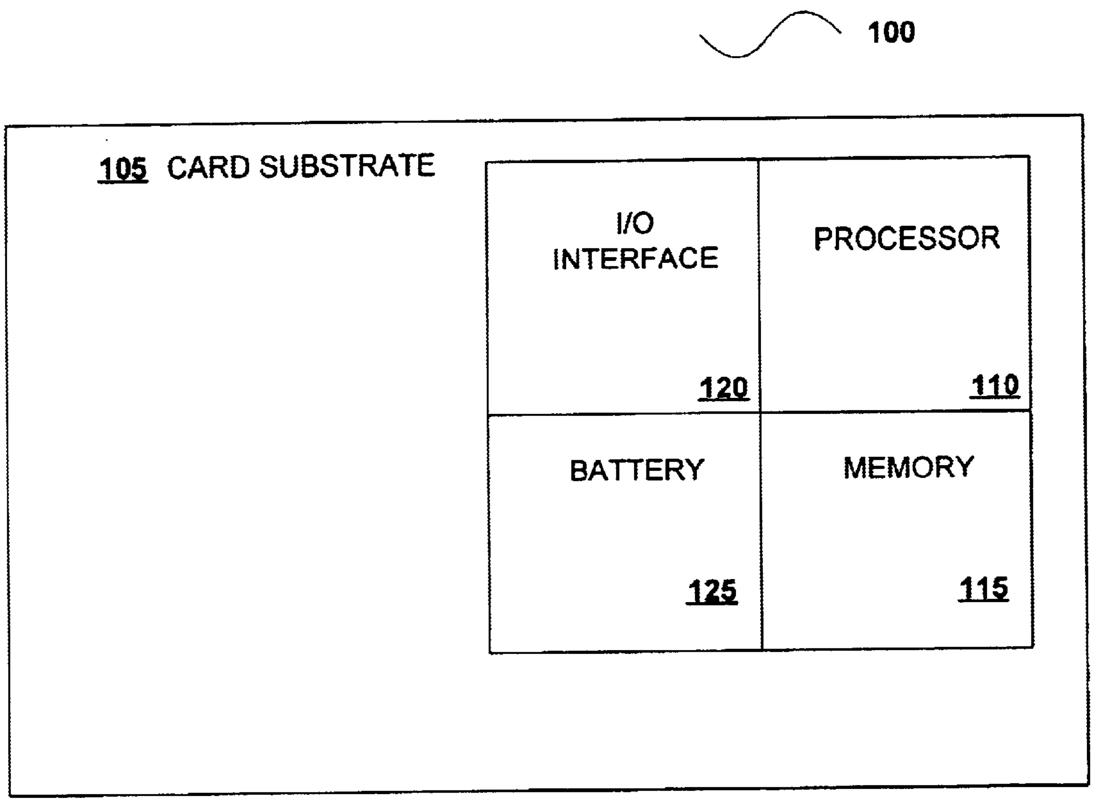
FIG. 1 is a block diagram of the components of a smart card.

FIG. 1 is a block diagram of the components of a smart card 100 that may be used in the present invention. The smart card may be designed for use with a gaming machine, gaming peripheral, gaming terminal or some other gaming device. The smart card 100 which may be the size of a magnetic striped card and may include an input/output interface 120, processor 110 memory 115 and battery 125 incorporated in some manner on a card substrate 105. The battery 125 is used to supply power to operate the devices on the smart card 100. In some embodiments, when it is inserted into a smart card reader of some type, power may also be supplied to the card by the smart card reader.

The smart card 100 may include an operating system of some type that is used to run applications on the smart card. In some embodiments, the operating system for the smart card 100 may be provided by Microsoft (Redmond, Wash.) or Sun Microsystems of Palo Alto, Calif. The operating system may be used to manage the execution of gaming applications on the smart card. The operating system and gaming applications may incorporated into the processor 110 as firmware, stored in the memory 115 on the smart card or may be implemented as a combination of firmware in the processor 110 and stored in the memory 115. The processor 110 may be a general purpose microprocessor or a custom microcontroller incorporating gaming specific firmware. The memory 115 may be flash memory.

The Input/output interface 120 may be an I/O EEPROM that allows the smart card 100 to communicate with a smart card reader (see FIGS. 2 and 3) or some other communication interface residing on a gaming machine, a gaming peripheral, a gaming terminal or some other gaming device designed to communicate with the smart card. Further, the I/O interface 120 may include one or more communication protocols that allow the smart card 100 to communicate with a gaming machine, gaming peripheral, gaming terminal or some other gaming device designed to communicate with the smart card. Some communication protocols may be stored in the memory 115 of the smart card 100. The communication protocols stored in the memory 115 may be added or deleted from the smart card 100 as needed.

The gaming applications incorporated into the smart card 100 and executed by the processor 110 may include but are not limited to bonus game applications, voucher applications, progressive game applications, paytable applications and player tracking applications. Other game applications (See FIG. 4) are also described. In the bonus game application, when a game player inserts the smart card 100 into a gaming machine and begins game play, game play information may be obtained by the smart card 100 from the gaming machine and stored in the memory 115 on the smart card.

When game play information is obtained by the smart card from the gaming machine, the game play information stored in the memory 15 of the smart card 100 may be updated as the player plays one or more games on the gaming machine. The game play information may include but is not limited to an amount wagered on each game, a time, a date and a game outcome for each game such as an award. The game play information may be stored on the smart card 100 in different categories. For instance, the game play information may be stored as generic game play information, which applies to all games, it may be stored as game specific play information, which applies to a specific game, or it may be stored as combinations of both generic game play information or game specific information.

Using the processor 110, the smart card 100 may operate on game play information as it is accumulated on the smart card. For instance, the smart card may store a running total of wager amounts made on the gaming machine for one or more games played while the smart card was inserted into the gaming machine during a game play sequence. In addition, the game play information stored on the smart card 100 may be accumulated from one or more previous games played on one or more different gaming machines. For example, a running total of wager amounts stored on the smart card 100 may include the sum of an amount wagered over 5 games on a first gaming machine on a first day at a first location, the sum of an amount wagered over games on a second gaming machine on a second day at a second location and the sum of an amount wagered on 15 games on a third gaming machine on a third day at a third location.

Using the game play information stored on the smart card, bonus game scenarios with different bonus game features may be developed. For example, a player may obtain a smart card issued that includes tracking features to a specific game such as Little Green Men. As the player plays games on gaming machines with smart card capabilities and featuring the Little Green Men game, the smart card collects game play information on the player's game play. When certain events occur, such as the player has exceeded a certain amount wagered, special bonus features within the Little Green Men game may begin to appear more often or a special bonus game available only to smart card users may be initiated. Another example would apply to all games that a player plays on different gaming machines using the smart card 100. Thus, when a player reaches a total amount wagered above an amount identified as a frequent player or high roller, which is stored on the smart card 100, all games in the casino may enable special bonus features for this player when a game is played on a gaming machine in conjunction with the smart card.

In the example above, the bonus game features on the gaming machine may be triggered using gaming instructions generated by the bonus game application executed by the processor 110 on the smart card 100. The gaming instructions may include 1) information, such as game play information, that the gaming machine may use to implement a bonus game, 2) high-level commands directing the gaming machine to perform one or more operations related to the bonus game, and 3) low-level commands directing the operations of specific devices residing on the gaming machine related to the bonus game. Thus, the computations and functions necessary to implement the bonus game on the gaming machine may be distributed in some manner between the processor on the smart card 100 and the processor on the gaming machine. For example, a processor on the gaming machine may generate gaming instructions for a game and a bonus game where some of the gaming instructions needed to present the bonus game are supplied by the smart card. In another example, the gaming instructions for a game and the gaming instructions for a bonus game displayed on the gaming machine may be supplied entirely by the smart card 100.

In the progressive game application, a player may have one or more progressive jackpots being played for which are tracked and managed on the smart card 100. This would allow a player to build the value of their ovrn progressive, which they are playing to win based upon game play on one or gaming machines at one or more locations. As game play continues, the value of the progressive prize they are playing for increases. When a specific trigger occurs, such as a certain combination of wheels on a spinning reel for a slot game, a particular card hand for a card game or even the result of a certain bonus game, the progressive prize may be won and credited to the players account.

The progressive game application, as well other gaming applications such as the paytable application and the voucher application, may be implemented in a manner similar to that described above for the bonus game application, i.e. the smart card 100 may obtain game playing information and generate gaming instructions allowing game application functions to be performed on the gaming machine. Thus, for the progressive game application, the smart card may accumulate game play information related to progressive game application, store the information in memory 115, and execute one or more progressive game applications that utilize the accumulated game play information using the processor 110 on the smart card 100. During execution of the progressive game application on the smart card 100, gaming instructions generated by the progressive game application may be used by the gaming machine to perform certain operations or the gaming instructions may direct the gaming machine to perform certain operations. Thus, the computations and functions necessary to implement the progressive game on the gaming machine, like the bonus game, may be distributed in some manner between the processor 110 on the smart card 100 and a processor on the gaming machine.

The game play information obtained by the smart card 100 may be stored in a shared memory location in the memory 115 on the smart card 100 such that it may be used by multiple gaming applications executed on the smart card. For example, the bonus game application and the progressive game application may both use a total wager amount accumulated by the smart card that is stored in a shared memory location. Also, in some embodiments, the shared memory location in memory 115 on the smart cardmay be accessed by the gaming machine.

In the paytable application, a user may obtain specific pay tables based on some selection criteria. These paytables may be stored in the memory 115 on the smart card 100. For instance, players such as high rollers, tournament players, return customers, and the like may be rewarded by pay tables which include odds allowing them to win more often then the walk in player. Based upon game play stored in memory 15 on the smart card, the pay table application may categorize a player into a category such as a high roller. For instance, when a high roller status is achieved, the pay table application may select a pay table from a plurality of paytables stored on the smart card and download the pay table to the gaming machine from the smart card 100 upon smart card insertion into the gaming machine. In another embodiment, the pay table application may categorize a player and generate a gaming instruction directing the gaming machine to utilize a particular paytable stored on the gaming machine where the paytable is used to determine a game outcome. In yet another embodiment, the smart card may generate the game outcome using a paytable and a random number generator stored on the smart card 100 and direct the gaming machine to present a game outcome presentation corresponding to the game outcome generated by the smart card.

In the voucher application, as a player plays one or more games on the gaming machine, the player may wish to cash out a certain amount of money, referred to as a safe haven. With a cashless ticketing system such as an EZ Pay Ticket System, a player may cash out a certain amount of money in the form of a ticket issued to the player. With the use of a smart card 100, the player may have the option of receiving a ticket or placing a voucher on the smart card. The options for cashless ticketing or voucher use may be presented to the player via one or more menus displayed on a display screen on the gaming machine. The voucher amounts may be accumulated into one amount or may be stored on the smart card as individual vouchers for use at a later time. For instance, a player may have accumulated $100 on a specific gaming machine. Of the $100 on the gaming machine, the player could elect to cash out $20 in the form of an EZ Pay ticket for use at a later time, or the player could elect to cash out $20 in the form of a voucher, which is stored on the Player's smart card. With the vouchers collected in the smart card, the player may transfer one or more of these vouchers to different gaming machines as coin-in or the voucher may be used at another venue such as a gift shop or restaurant as an indicia of credit for a purchase. In addition, the player may cash out a voucher stored on the smart card at a cashier station or some other location.

An advantage of executing gaming applications on a smart card is that many gaming services may be provided on a gaming machine without employing a dedicated network as required when the gaming service application is executed on a single server. When a smart card is used, a dedicated network may not required because the gaming applications are executed on each smart card in a distributed manner, rather than on a single server. For instance, progressive games have traditionally been provided to a group of gaming machine by linking the gaming machines in the group in a network and then executing a progressive gaming application for the group on a single server in communication with each gaming machine in the group. With multiple smart cards each executing a copy of a progressive gaming application, a progressive gaming application may be provided to a player while playing games on a group of gaming machine that are not connected via a dedicated gaming network.

Thus, in general, smart cards may be used to provide gaming services to groups of gaming machines without a dedicated network or dedicated server. This approach may be advantageous for providing a gaming service to a small group of if 15 gaming machines, such as in a small establishment, where the cost of a dedicated server and a dedicated network is not feasible. In addition, the smart cards may be used to augment gaming services, such as progressive games or bonus games, in larger establishments where dedicated networks and servers are available. Details of gaming services executed on a smart card are described with reference to FIGS. 2–7.

Figure 2:
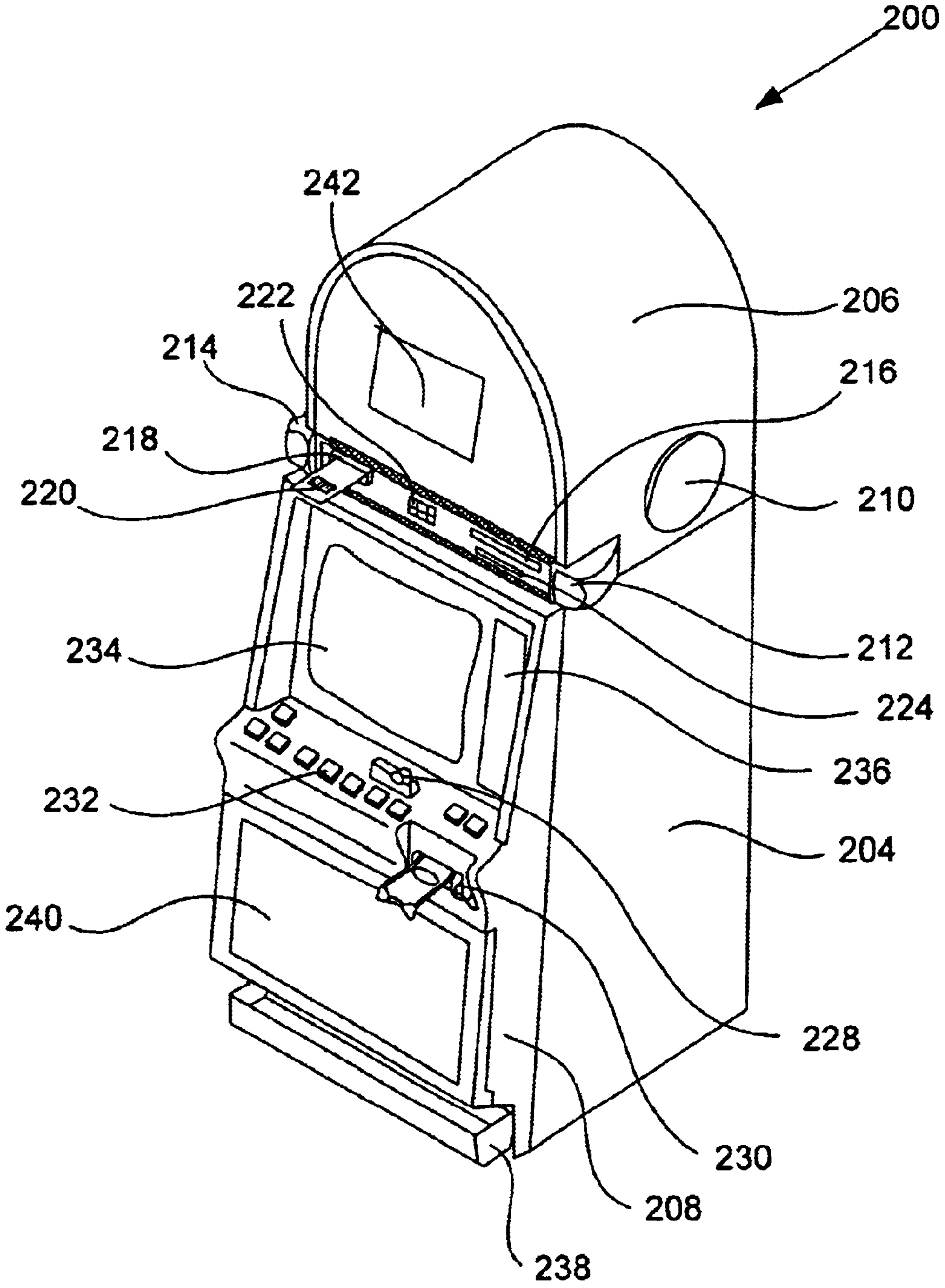
FIG. 2 is a perspective drawing of a gaming machine having a top box and other devices.

Turning to FIG. 2, a video gaming machine 200 of the present invention is shown. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 240. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for Example, the number of coins played. The bill validator 230, player-input switches 232, video display monitor 234, and information panel are devices used to play a game on the game machine 202. The devices are controlled by circuitry (See FIG. 3) housed inside the main cabinet 204 of the machine 200. Many possible games, including traditional slot games, video slot games, video poker, video pachinko, video blackjack, general card games, bonus games and video keno games, may be provided with gaming machines of this invention.

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print bar-coded tickets 220, a key pad 222 for entering player tracking information, a florescent display 216 for displaying player tracking information, a card reader 224 for entering a magnetic striped cards or smart cards executing gaming applications. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (See FIG. 3) housed within the main cabinet 204 of the machine 200.

Understand that gaming machine 200 is but one example from a wide range of gaming machine designs on which the present invention may be implemented. For example, not all suitable gaming machines have top boxes or player tracking features. Further, some gaming machines have two or more game displays—mechanical andvor video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 2, when a user wishes to play the gaming machine 200, he or she inserts cash through the coin acceptor 228 or bill validator 230. In addition, the player may use a cashless instrument of some type to register credits on the gaming machine 200. For example, the bill validator 230 may accept a printed ticket voucher, including 220, as an indicia of credit. As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 200 is located or the ticket may have been generated at another property for example a second casino.

The cashless instrument typically contains information used to register credits on the gaming machine, including gaming machine 200, and validate the registration transaction. For example, when a smart card is used as a cashless instrument, the smart card voucher may contain information including: 1) a voucher value, 2) a voucher issue date, 3) a voucher issue time, 4) a voucher transaction number, 5) a machine ID, 6) a voucher issue location and 7) a voucher owner. The smart card may store voucher information for multiple vouchers stored on the smart card. The voucher information may be used in the voucher gaming application described above.

Information such as the voucher value, the voucher issue date, the voucher issue time, the voucher number and the machine ID may be common to cashless systems that generate and validate vouchers issued at a single property. However, information such as the voucher issue location and the voucher owner may be needed to allow multi-site generation and validation of cashless instruments. Details of a multi-site generation and validation of cashless instruments are described in copending U.S. patent application Ser. No. 09/648,382 entitled a CASHLESS TRANSACTION CLEARINGHOUSE filed Aug. 25, 2000 by Rowe the entire specification of which is incorporated herein by reference.

Other types of information, besides the voucher information listed above, may be stored on the cashless instrument such as the smart card. For example, the smart card may contain information regarding a promotional prize that may be won by the player when the voucher is utilized in the gaming machine 200. The promotional prize may involve multiple properties and particular types of gaming machines. Thus, a smart card containing voucher information and other types of gaming information may be used at multiple venues.

The information on the cashless instrument may be recorded on the cashless instrument when the cashless instrument is generated. In the case of the smart card, the generation of the smart card refers to storing or encoding this information on the smart card. The generation of the smart card voucher may occur when the smart card is inserted into the card reader 224 in the gaming machine 200 or at another site where smart cards are issued. For instance, as described above, a player may create a voucher of a particular amount on a smart card by executing a voucher application residing on the smart card while the smart card is inserted into a gaming machine. As another example, a smart card vouchers may be generated and modified at ATM-like terminals, at a cashier station where a player cashes out or prepaid smart cards, may be purchased within the gaming property (e.g. casino).

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 232, the video display screen 234 or using some other device which enables a player to input information into the gaming machine. These input devices may also be used to supply information and make decisions for gaming applications executed on the smart card. For example, using a touch screen a player may input a pin number for validating a smart card.

During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240. Auditory and visual effects may be affected by a gaming application executed on the smart card such as a bonus game application or by gaming components stored on the smart card. For instance, a smart card may store a video component such as a photograph which may be incorporated into a game presentation as part of a game play or an audio component such as song stored in an MP-3 format which may be projected from the speakers 210 and 212. After the player has completed a game, a cashless instrument may be generated at the gaming machine 200. The cashless instrument may be a printed ticket voucher, a smart card, debit card or other cashless medium. For example, the player may decide to cashout and may receive the ticket 220 from the printer 218, which may be used for further games or to redeem a prize. Further, the player may receive a ticket 220 for food, merchandise, game services or other promotions from the printer 218 that may be used at the gaming property where the gaming machine is located or at other gaming properties. The player may view cashless instrument transaction information stored on the smart card on the video display screen 234 or the florescent screen 216. For instance, when a player cashes out from the gaming machine, the value of one or more vouchers stored on the smart card may be displayed using the video display 234 or the video display 242.

Figure 3:
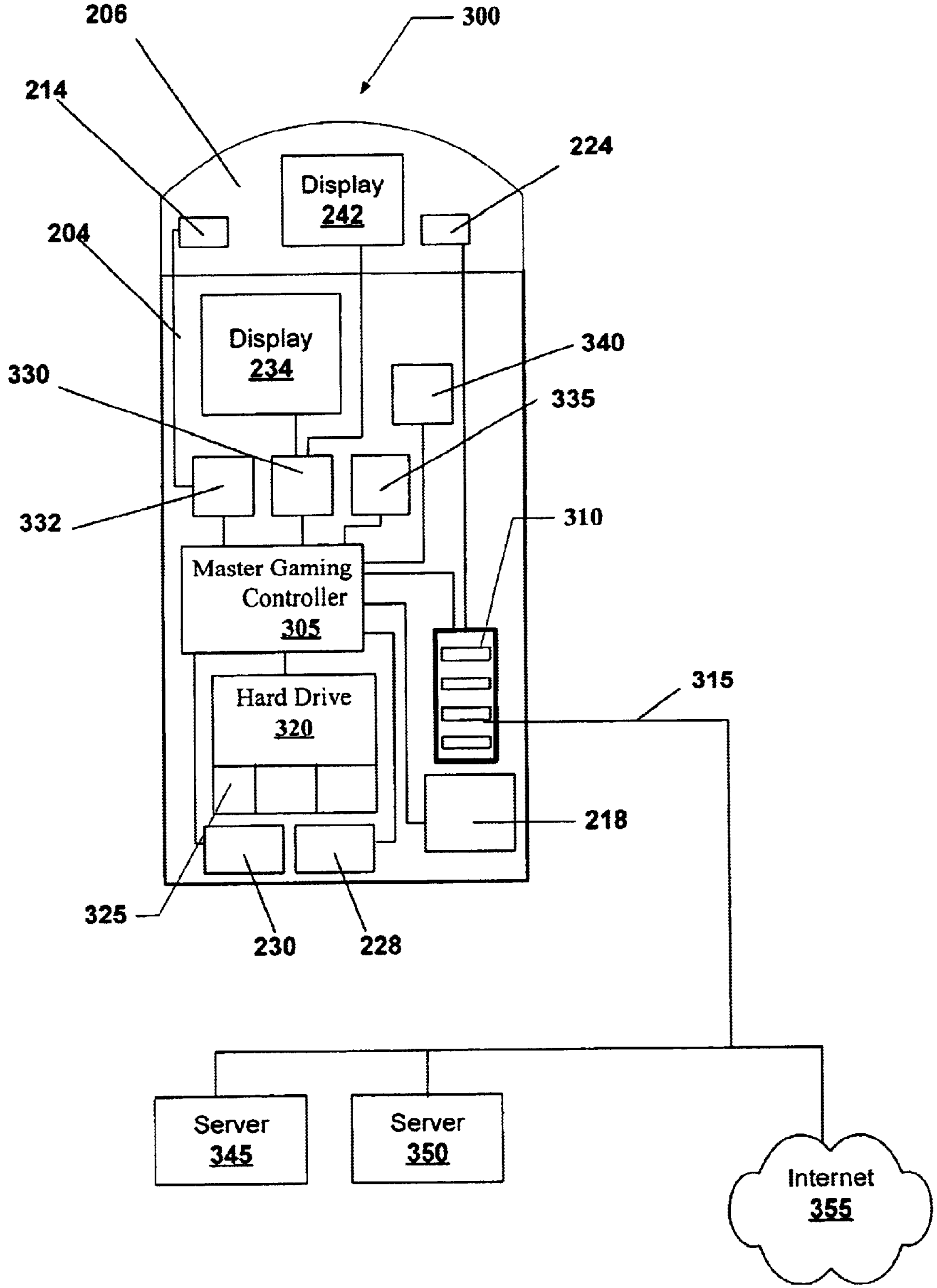
FIG. 3 is a block diagram of a gaming machine connected to a local area network.

FIG. 3 is a block diagram of the components of a gaming machine 300 where the gaming machine is connected to a local area network 315. Components that appear in FIG. 2 are identified by common reference numerals. A master gaming controller 305 controls the operation of the various gaming devices and the game presentation on the gaming machine 300. Using a game code and graphic libraries stored on the gaming machine 300, the master gaming controller 305 generates a game presentation which is presented on the displays 234 and 242. The game presentation is typically a sequence of frames updated at a rate of 75 Hz (75 frames/sec). For instance, for a video slot game, the game presentation may include a sequence of frames of slot reels with a number of symbols in different positions.

When the sequence of frames is presented, the slot reels appear to be spinning to a player playing a game on the gaming machine. The final game presentation frames in the sequence of the game presentation frames are the final position of the reels. Based upon the final position of the reels on the video display 234, a player is able to visually determine the outcome of the game.

Each frame in sequence of frames in a game presentation is temporarily stored in a video memory located on the master gaming controller 305 or alternatively on the video controller 330. The gaming machine 300 may also include a video card (not shown) with a separate memory and processor for performing graphic functions on the gaming machine 300. Typically, the video memory includes 1 or more frame buffers that store frame data that is sent by the video controller 330 to the display 234 or the display 242.

The frame data stored in the frame buffer provides pixel data (image data) specifying the pixels displayed on the display screen. The master gaming controller 305, according to the game code, may generate each frame in one of the frame buffers by updating the graphical components of the previous frame stored in the buffer. In a similar manner, the master gaming controller 305 may generate audio components that are output to a speaker 214 using the sound controller 332.

In the present invention, the video components and audio components of a game presentation, as well as the configuration of the gaming machine during game play, may be affected by game components stored on a smart card or by gaming instructions generated by applications executing on the smart card. In one embodiment, game graphic components and game sound components may be downloaded from memory on the smart card via the smart card reader 224. For instance, images stored on the smart card, in a graphics format such as MPEG, may include specific images of the player or the player's favorite pet. Sounds stored on the smart card, in a sound format such as MP-3, may include one or more of a players favorite songs.

The graphical and sound oriented game components may be incorporated into a game presentation on the gaming machine 300 and presented to the player using the displays, 234 and 242 and the speaker 214. Game component information from the smart card may be stored in RAM memory on the master gaming controller 305, may be stored in a smart card data partition 325 of a hard drive 320, may be store in a non-volatile memory 335 or may be stored in some other memory location on the gaming machine. In some embodiments, the game components used in the game presentation may be preloaded into the smart card at the time the player receives their smart card or may be downloaded to the card from a cashless system, such as the EZ Pay smart card and Ticket System, while the smart card is in use at the gaming machine 300. In addition, as a souvenir, a player may receive copy of a frame from a game presentation from the printer 218 where the frame includes game components downloaded from the smart card. Further, a copy of the frame may be stored on the smart card and later viewed by the player.

In another embodiment, game configuration parameters and denomination selection parameters may be loaded on the smart card at the time the smart card is issued. The initial parameters on the smart card may be set by the casino or may be defined by the player. During game play, a player may insert their smart card into the gaming machine 300 using the smart card reader 224. After the smart card is inserted into the smart card reader 224, the smart card reader 224 may transfer game configuration parameters and denomination selection parameters to the master gaming controller 305 via the main communication board 310. In some embodiments, the smart card reader 224 may be directly connected to the master gaming controller 305. Next, based on the configuration parameters stored on the smart card and downloaded to the gaming machine, certain game types, such as card games, spinning reel games, test games available only on certain gaming machines, or other specialty game types available on the gaming machine 300 may be displayed while other games available on the same gaming machine may not be displayed. To initiate game play on the gaming machine, the player may first select from among a number of displayed games available on the gaming machine.

When denomination selection parameters are downloaded to the gaming machine from the smart card inserted into the smart card reader 224, the gaming machine 300 may be configured to reflect a players preferred betting patterns. For instance, a $1 player would have only $1 denominations enabled on the gaming machine while 1 cent player, would have only 1 cent denominations enabled, etc. In addition, the smart card may include applications that generate gaming instructions encouraging a player to adjust the denomination of game play. For example, based on an gaming instruction generated during execution of an application of the smart card, the gaming machine 300 may display a message on one of the displays, 234 or 242, indicating the player can play for a certain prize by increasing the denomination of their game play. The master gaming controller 305 may display the message indicated by the smart card in response to a command generated by the smart card and included in a gaming instruction sent to the master gaming controller. For instance, the command contained in the gaming instruction from the smart card may be "display message A."

The game configuration parameters may also be adjusted by a game configuration application executed by the smart card. In one embodiment, during execution of the game configuration application, gaming instructions containing game configuration parameters may be sent to the master gaming controller 305 where the game configuration parameters in the gaming instructions may be a function of previous game play history information stored on the smart card. Thus, for instance, only players that have accumulated a certain amount of game play, such as a total amount wagered over a number of games, may be able to play certain games available on the gaming machine 300.

While the player is playing one or more games on a particular gaming machine, a smart card inserted into the smart card reader 224 may regularly communicate with the gaming machine 300. For instance, while the smart card is inserted into the smart card reader 224, the smart card may receive regular updates of game play history information, such as money accepted into the gaming machine via the bill validator 230 and coin acceptor 228 or an amount wagered on a particular game, from the master gaming controller 305 on the gaming machine 300. The game play history information sent by the master gaming controller may be used to update game play history information stored on the smart card by one or more gaming applications executed on the smart card, such as the bonus game application, the voucher application, the paytable application and the progressive game application.

The gaming application executed on the smart card may regularly check the updated game play history information stored on the smart card and issue various gaming instructions to the master gaming controller 325 on the gaming machine 300 during a sequence of game play. For instance, a game play sequence on the gaming machine 300 may include a wager, a game presentation and a game award for three successive games. After each of the three wagers, the master gaming controller 325 may send a message to the smart card containing information indicating an amount wagered. After each of the three game awards, the master gaming controller 325 may send a message to the smart card containing information an amount awarded. The amount wagered prior to each of the three games and the amount awarded after each of the three games may be processed by one or more applications executing on the smart card and may be stored in memory on the smart card (See FIG. 1).

During processing of data from the master gaming controller, the data in each message may be modified or combined with other data previously stored on the smart card. For instance, a player may have bet a total of $499 on previous games recorded on the smart card and may have $100 credits stored on the smart card. For each of games 1, 2 and 3, the player may wager $1, which is subtracted from the smart card each time, and for game 1 and for game 2 may be awarded nothing but may be awarded $50 for game 3. Thus, after games 1, 2 and 3, the bet total and the credit stored on the smart card may each be, respectively: 1) $500 and $99, 2) $501 and $98 and 3) $502 and $97.

Gaming applications executed on the smart card may send different gaming instructions to the master gaming controller 325 based on the bet total and credit stored on the smart card after each game. For instance, after the bet total reaches $500, a bonus application executing on the smart card may send a gaming instruction to the master gaming controller instructing the master gaming controller to display a bonus game application of some type. As another example, a player tracking application on the smart card may send a gaming instruction with the bet total and credit stored on the smart card to the master gaming controller after the award of each game. The bet total and the credit contained in the gaming instruction from the player tracking application may be forwarded by the master gaming controller 305 to a server, such as server 345 or server 350, connected to the gaming machine via the local area network (LAN) 315.

In yet another example using the game play sequence described above, after the wager in game 3, a progressive game application executing on the smart card may determine that the player has won a progressive jackpot of some type. The progressive jackpot may comprise the $50 awarded for game 3 or may augment an award by the gaming machine (e.g. $40 from the gaming machine and $10 from the progressive application executing on the smart card). Further, after the $50 award is made in game 3, a voucher application executed on the smart card may query the player via one of the displays on the gaming machine 300 whether the player wants to store the $50 award as a voucher on the smart card.

In the examples above, one or more of the gaming applications may be executed simultaneously on the smart card during the game play sequence. Thus, the bonus game application, player tracking application, progressive game application may be executing simultaneously on the smart and gaming instructions from each of the applications, which affect the game play, may be received by the master gaming controller 325 from the smart card. Therefore, depending on the gaming applications executed by a particular smart card, on gaming parameters used by each of the gaming applications on the smart card and a player's game play history, many different game play sequences on a gaming machine 300 involving gaming instructions generated by a master gaming controller 305 and gaming instructions generated by a smart card are possible and are not limited to the examples above which were presented for illustrative purposes only.

A smart card inserted into a smart card reader 224 may communicate with a master gaming controller 325 using communication protocols unique to smart cards, may use communication protocols common to gaming machines or combinations of both. For instance, a smart card may communicate with the gaming machine 300 using a Slot Accounting System (SAS) protocol or a Netplex communication protocol developed by IGT (Reno, Nev.). When a smart card is inserted into a gaming machine 300, the smart card may establish communications with the gaming machine in some standard communication protocol used by both the gaming machine 300 and the smart card. Then, the smart card may send the gaming machine a list of gaming applications and communication protocols supported by the smart card which may be used in a game play sequence on the gaming machine. Further, the gaming machine may send the smart card gaming machine identification information such as gaming machine serial number which may be used by the smart card to determine what gaming applications and communication protocols are supported by the gaming machine.

The smart card may communicate with other devices other than the gaming machine when inserted into the smart card reader 224. For example, via the main communication board 310 on the gaming machine, the smart card may communicate with one or more game service servers, such as server 345 and 350, connected to the gaming machine 300 via a LAN 315. The game service servers may provide one or more game services such as an accounting server, a bonus game server, a progressive game server, a player tracking server and a cashless system server. In addition, the smart card may communicate with devices in communication with the gaming machine via a wide area network such as the Internet 355.

By communicating with remote servers connected to a gaming machine, a smart card may augment the services provided by these remote servers in a distributed manner. For instance, player tracking services are usually only provided to gaming machines connected in a dedicated network to a player tracking server. Using the smart card, a player may engage in game play sequences on a plurality of gaming machine that are not connected to the dedicated communication network of a player tracking server and then engage in a game play sequence on a gaming machine connected to the player tracking server. When the smart card is inserted into a smart card reader on the gaming machine connected to the player tracking server, the smart card may contact the player tracking server and send game play information to the player tracking server about game play recorded on the smart card from game play sequences on gaming machines not connected to the player tracking server. The game play recorded the smart card may be obtained using player tracking gaming instructions generated by a player tracking gaming application executed on the smart card. Thus, with the smart card, player tracking services may be extended to gaming machines not connected to the player tracking server. In a similar manner, using a smart card, other gaming services provided by a game service server may be extended to gaming machines not connected to the game service server.

The smart card may communicate with the gaming machine 300 via communication interfaces other than the smart card reader 224. For instance, a player may carry a portable wireless communication interface that accepts a smart card. Thus, the smart card inserted into the portable wireless communication interface may communicate with the gaming machine 300 using the wireless communication interface 340.

Since the smart card executing a gaming application, as described above, may provide gaming instructions to a gaming machine directing it operation, security is important with smart cards. Since the smart card contains a computer and memory, it may be possible that someone who finds or obtains a smart card, may attempt to hack into the card to access the available cash, credit and other information stored on the smart card. To prevent these types of security breaches, the data on the card may be encrypted using encryption schemes such as DES, double DES, etc. Also, a digital signature may be may be stored on the card requiring the combination of the card itself and specific security parameters that are owner specific to be entered prior to use of the smart. The security parameters may include pin numbers and biometric information such as retina information or fingerprint information obtained from a retina scanner or a finger print scanner.

Once the security parameters are entered, the smart card combines the security information with other security information stored on the smart card to form the digital signature. The digital signature may be compared with the digital signature stored on a central computer accessible to the gaming machine and the smart card or with information stored on the smart card itself. When the comparison of the digital signature is successful, the use of the smart card is allowed. When the comparison of the digital signature is not successful, the smart card may be allowed a predefined number of retries. Once the number of retries has been exceeded, the smart card may enter a fail-safe mode. The fail-safe mode may have to be cleared by a central computer where the smart card was issued before the smart card can be used again. In addition, via a central computer system or any system connected to gaming devices or other devices that allow smart card use, a smart card may be cancelled at any time. Once the smart card has been cancelled, the owner of the smart card must get the card reissued.

In the present invention, the functions of the smart card, described above, may be performed by other gaming devices. For instance, a player may carry a personal digital assistant (PDA) that executes gaming applications such as a bonus game application, a voucher application, a progressive game application and a paytable application. The PDA may communicate with the gaming machine via a wireless communication interface, such as 340. In the manner described above for the smart card, gaming applications executing on the PDA may generate gaming instructions containing information and commands to the gaming machine. The gaming instructions, from the PDA, may be executed by the gaming machine as part of a game play sequence on the gaming machine. There are many different types of PDAs from many different manufacturers. One example of a PDA that may be adapted for use with the present invention is the Palm VII from Palm, Inc., Santa Clara, Calif.

Figure 4:
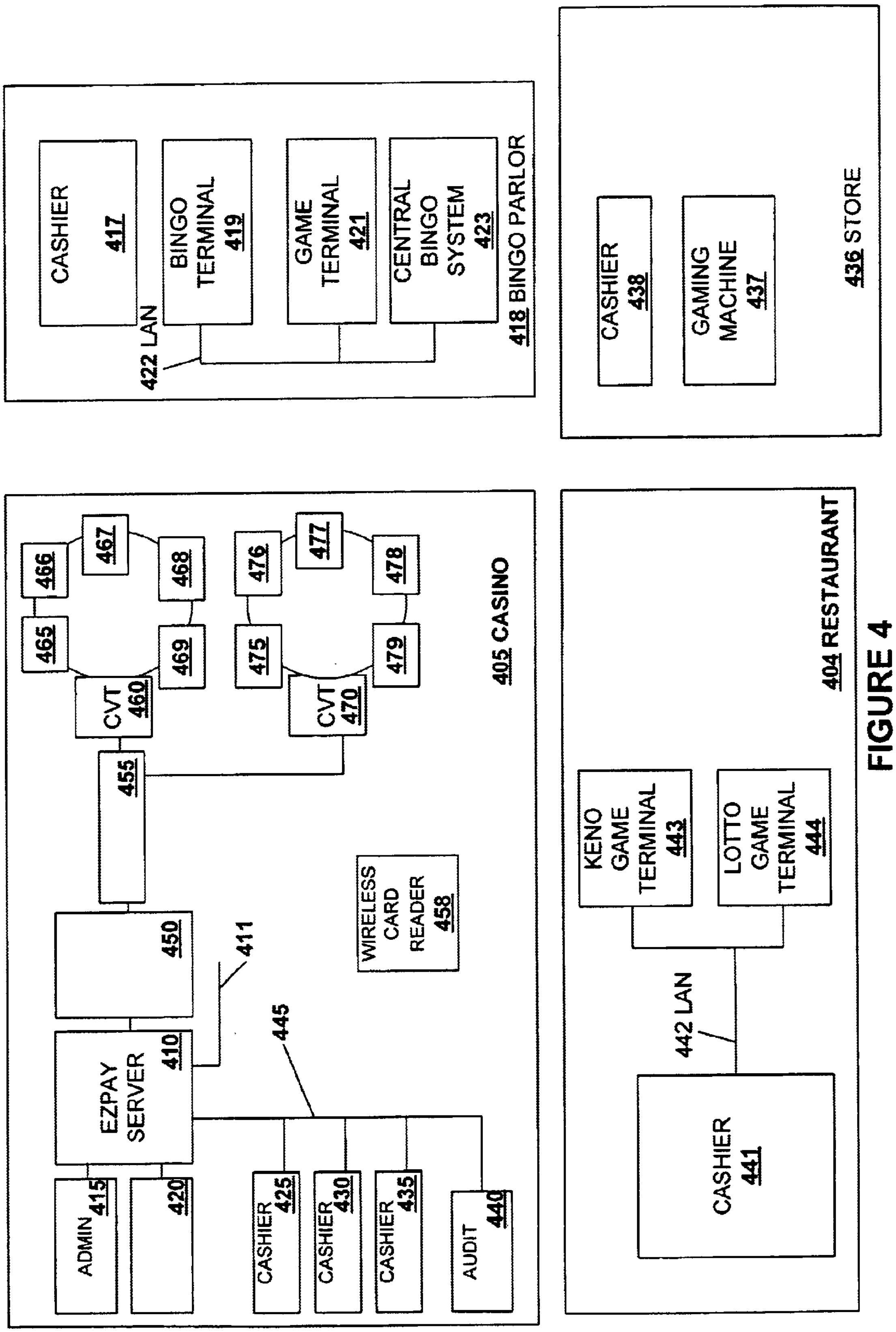
FIG. 4 is a block diagram containing a plurality of gaming venues with various gaming devices.

FIG. 4 is a block diagram containing a plurality of gaming venues including a casino 405, a restaurant. 404, a bingo parlor 418 and a store 436 where a smart card may be utilized. In one embodiment, the smart card may be used with a cashless system such as an EZ pay ticket voucher system. A cashless system is the hardware components and software components needed to generate and validate cashless instruments. In FIG. 4, one embodiment of the components of a cashless system that may be used with a smart card is shown within the casino 405.

Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ pay ticket voucher system. Typically, a cashless system is installed at each property utilizing cashless instruments. To allow multi-site validations of cashless instruments, the cashless systems at each property may be linked to a cashless instrument transaction clearinghouse.

Returning to FIG. 4, a first group of gaming machines, 465, 466, 467, 468, and 469 is shown connected to a first clerk validation terminal (CVT) 460 and a second group of gaming machines, 475, 476, 477, 478 and 479 is shown connected to a second CVT 470. All of the gaming machines print ticket vouchers which may be exchanged for cash or accepted as credit of indicia in other gaming machine located within the property 405. In this example, the ticket voucher serves as a cashless instrument. In addition, the gaming machines may contain smart card readers for reading voucher information stored on smart cards. As described above, vouchers stored on the smart card may be used for game play on the gaming machines.

The CVTs, 460 and 470, store cashless instrument transaction information corresponding to the outstanding cashless instrument, including ticket vouchers, smart cards and debit cards, that are waiting for redemption. In addition, cashless instrument transaction information may be stored in a cashless server including the EZ pay server 410. The cashless instrument transaction information may be used when the vouchers are validated and cashed out or redeemed in some manner. The CVTs 460 and 470 may store the information for the ticket vouchers printed by the gaming machines connected to the CVT. In addition, the CVTs 460 and 470 may store the information for vouchers stored on a smart card that were generated on each gaming machine. For example, CVT 460 stores voucher information for vouchers issued by gaming machines 465, 466, 467, 468, and 469. In addition, the CVTs may store security information, as described above for the smart cards. The security information may be used to validate a digital signature generated by the smart card or to cancel a card.

When a voucher is issued to a smart card, voucher information and security information may be sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufactured by IGT, Reno, Nev.

In this embodiment, when a player wishes to cash out a voucher, the player may redeem vouchers issued from a particular gaming machine at the CVT associated with the gaming machine or any other CVT which is part of the cashless system associated with the CVT. For example, since CVT 460 and CVT 470 are connected as part of a single cashless system to the EZ pay server 410, a player may redeem vouchers or utilize vouchers at the gaming machines, the CVT's (460 or 470), the cashiers (425, 430, 435, and 440) or the wireless cashiers 458. The CVTs, cashiers, wireless cashiers and gaming machines may be referred to as "cashless validation sites."

To cash out a voucher stored on a smart card, the smart card is inserted into a smart card reader at the cashless validation site and the authenticity of the smart card is determined. For an authenticated smart card storing one or more vouchers, one of the vouchers is validated by comparing information obtained from the voucher with information stored within the CVT. After a ticket voucher has been cashed out, the CVT marks the voucher paid in a database to prevent a voucher with similar information from being cashed multiple times.

In this embodiment using the EZ pay system, multiple groups of gaming machines connected to CVTs are connected together in a cross validation network 445. The cross validation network is typically comprised of one or more concentrators 455 which accepts inputs from two or more CVTs and enables communications to and from the two or more CVTs using one communication line. The concentrator is connected to a front end controller 450 which may poll the CVTs for voucher information. The front end controller is connected to an EZ pay server 410 which may provide a variety of information services for the cashless system including accounting 420, administration 415, as well as smart card security.

In this invention, a single hardware and software platform allowing cashless instruments to be utilized at all of the cashless validation sites (e.g. cashier stations, gaming machines, wireless cashiers and CVTs) within a single property or across multiple properties may be referred to as a "cashless server". In this embodiment, the EZ pay server 410 may function as the cashless server. Usually, the cashless server is a communication nexus in the cross validation network. For instance, the EZ pay server 410 is connected to the cashiers, wireless devices, CVTs and the gaming machines via the CVTs. Since the EZ pay server 410 is connected to all of the devices utilizing smart cards, it may be used to implement smart card security features such as clearing the use of a smart card after it has entered a fail-safe mode as previously described or canceling a smart card.

The cross validation network allows vouchers issued by any gaming machine connected to the cross validation to be accepted by other gaming machines in the cross validation network 445. Additionally, the cross validation network allows a cashier at a cashier station 425, 430, and 435 to validate any voucher generated from a gaming machine within the cross validation network 445. To cash out a voucher, a player may present a smart card storing one or more vouchers at one of the cashier stations 425, 430, and 435 or to a game service representative carrying a wireless gaming device for validating ticket vouchers. A more complete discussion of the details of the wireless gaming device 458, including hardware and utilization, are described in copending U.S. patent application Ser. No. 09/544,844 entitled a WIRELESS GAME ENVIRONMENT filed Apr. 7, 2000 by Rowe the entire specification of which is incorporated herein by reference. Information obtained from the voucher may be used to validate the voucher by comparing information on the ticket with information stored on one of the CVTs connected to the cross validation network or with information stored in the EZ pay server 410.

As vouchers stored on smart cards are validated, this information may be sent to audit services computer 440 providing audit services, the accounting computer 420 providing accounting services or the administration computer 415 providing administration services. In another embodiment, all of these services may be provided by the cashless server including the EZ pay server 410. Examples of auditing services, which may be provided by cashless system software residing on the auditing computer 440 include 1) session reconciliation reports, 2) soft count reports, 3) soft count verification reports, 4) soft count exception reports, 5) machine voucher status reports and 5) security access report. Examples of accounting services, which may be provided by cashless system software residing on the accounting computer 420 include 1) voucher issuance reports, 2) voucher liability reports, expired voucher reports, 3) expired voucher paid reports and 4) voucher redemption reports. Examples of administration services, which may be provided by cashless system software residing on the administration computer 415 include 1) manual voucher receipt, 2) manual voucher report, 3) voucher validation report, 4) interim validation report, 5) validation window closer report, 6) voided voucher receipt and 7) voided voucher report.

In this invention, a smart card used at the casino 405 may also be used at other venues. For instance, after storing one or more cashless vouchers on a smart card, a player may take the smart card to the bingo parlor 418. At the bingo parlor 418, a player may utilize the smart card at the bingo terminal 419 and game terminal 421 which may be connected to a LAN 422 to a central gaming system 423. At the cashier 417, electronic bingo cards may be downloaded to the smart card from the central electronic bingo system 423 and issued to the player. The player then may insert the smart card into the stationary player such as the bingo terminal 419, handheld player, or other applicable game play devices and may load the bingo cards from the smart card for use in a bingo game. As the bingo games are played, the smart card is updated and the player may receive player points for game play or cash/vouchers for game wins. Player tracking information and voucher information may be stored on the smart card and communicated back to the central bingo system 423. The player can reload the smart card with additional bingo cards as needed. In addition, when the player does not already have a smart card, the player may sign up for a smart card where the bingo cards are purchased (e.g. cashier 417).

Using the smart card, a player may also have one or more bingo progressive jackpots being played for which are tracked and managed on the smart card. This would allow a player to build the value of their own bingo progressive, which they are playing to win based upon bingo game play. As bingo game play continues, the value of the bingo progressive prize they are playing for increases. When a specific trigger occurs, such as a certain bingo card combination, the bingo progressive prize may be won and credited to the player account.

In the bingo parlor 418, a player may play other games besides bingo at the game terminal 421. For instance, a customer may wish to purchase a predefined set of electronic pull-tabs. In an electronic pull-tab, a player may reveal covered symbols in columns and rows displayed in the pull-tab game. The symbols that are revealed allow the player to determine whether an award was obtained. The pull-tabs may be purchased at the cashier 417 and may be placed on the smart card to be played in one of the electronic player devices which allows the user to play the pull-tab game such as the game terminal 421. All player points associated with the pull-tab purchases and the results of the pull-tab game play may be collected and stored on the smart card. All pull-tab wins may also be stored on the smart card and may be redeemable at a redemption center. The pull-tab game play and bingo game play using the smart card is not limited to the bingo parlor and may be extended to other venues such casinos, stores and restaurants. In addition, other electronic games, as approved by a given gaming jurisdiction maybe used with the smart card.

After playing at the casino 405 and the bingo parlor 418, a player may enter the restaurant 404 and play a keno game or a lotto game. The player may purchase keno game plays and lotto game plays from a cashier terminal 441 connected to the keno game terminal 443 and lotto game terminal 444 by a LAN 442. The keno game plays and lotto game plays may be downloaded to the player's smart card. At the keno game terminal 443 and at the lotto game terminals 444 located at a table where the player may be eating, the player may use their smart card at the terminals to play the lotto games and keno games stored on the card. Within a keno or lotto environment a certain set of numbers are drawn with the player attempting to match those numbers, the smart card may contain sets of lucky numbers and associated game types the player wishes to use each time the player plays. In this manner, the player need only establish the set of numbers one time. Further, as described above, the smart card may execute applications allowing the player to store cash vouchers awarded from keno game play or lotto game play and accumulate loyalty points on the smart card from keno game play and lotto game play.

After using the smart card at the casino 405, the bingo parlor 418, the restaurant 404, the play may go to the store with their smart card. At the store 436, the player may purchase gift items at the cashier 438 and engage in game play at the gaming machine 437. Using the smart card, the player may accumulate loyalty points based on their purchases and game play. In addition, the player may use vouchers stored on the smart card for game play or purchases. In another example, the player may win a progressive jackpot on the gaming machine 437 based upon progressive game information stored on the smart card from game play at one or more venues.

An advantage of the smart card is that player points and cash awards obtained at multiple venues (e.g. casinos, restaurants, stores, bingo parlors, race tracks, bars, etc.) may be tracked using a player tracking application and a voucher application, as described above, executing on the smart card. Player points may be accumulated through the purchase of bingo cards, pull tabs, keno game play, casino game play, food, gifts and beverages, etc. The smart card accumulates and manages these points for the player whereby the points can be redeemed for cash and prizes as the necessary points are obtained. Thus, the smart card may be easily moved from one venue to the next where loyalty points for the smart card use can be accumulated and redeemed. Further, cash totals resident on the smart card may be used as well at each of the venues.

Using the smart card, cross-game progressives are possible. In a cross-game progressive, a progressive jackpot may be built from game play on different types of games such as slot games, card games and bingo games. For instance, a cross game progressive jackpot may be accumulated on the smart card from game play on gaming machine 479 in the casino 405, bingo game play on the bingo terminal 419 in the bingo parlor 418, game play on the gaming machine 437 in the store 436 and keno game play on the keno game terminal 443 in the restaurant 404. Depending on the game a player is playing, specific triggers associated with each type of game may allow the player to win the cross-game progressive. For instance, after a certain bingo game combination, after a certain combination of wheels on a spinning reel, after a particular card hand or after a result from a certain bonus game, the cross-game progressive prize may be won and credited to the players account. Using the smart card, progressive game promotions may be developed where game play is encouraged on certain combinations of games.

Figure 5:
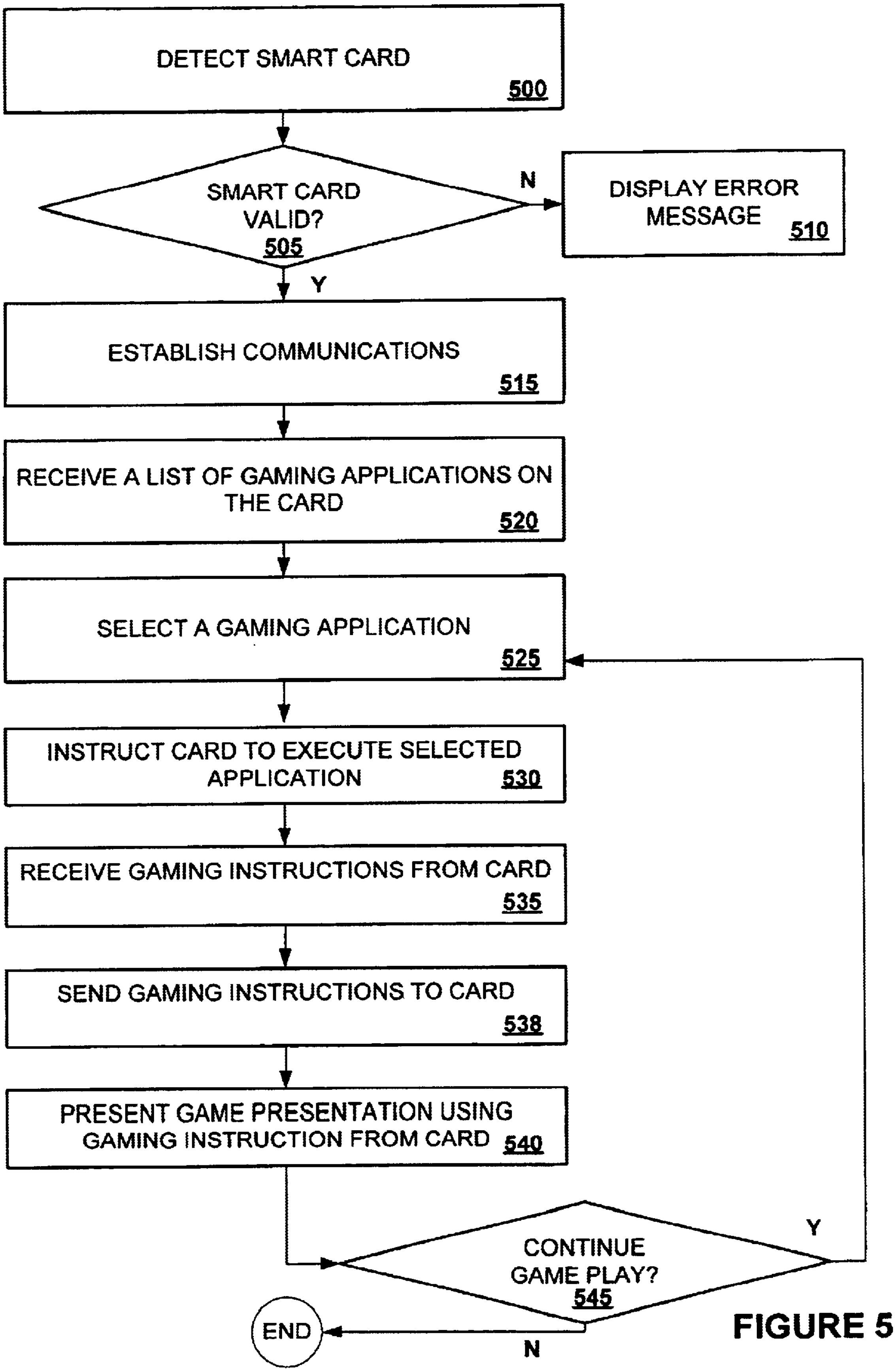
FIG. 5 is a flow chart depicting a method in a gaming machine for executing a game play on the gaming machine with the aid of a smart card.

FIG. 5 is a flow chart depicting a method in a gaming machine for executing a game play on the gaming machine with the aid of a smart card. In 500, the gaming machine detects that a smart card has been inserted into a smart card reader on the gaming machine. The gaming machine may detect the presence of the smart card after it has received a signal from the smart card reader indicating a smart card has been inserted into the smart card reader. In 505, the gaming machine determines whether the smart card is valid. The validation process may include the game player inputting a pin number or other biometric information (e.g. a finger print or retina scan) into the gaming machine. This information, as well as other information stored on the smart card, may be used to create a digital signature. The digital signature may be compared with a digital signature stored on a remote computer.

In 510, when the smart card is invalid, the gaming machine may display an error message such as "smart card not valid, please see attendant." An error message may be displayed after a player incorrectly types the pin number for the smart card a number of times or the smart card has been cancelled. In 515, the gaming machine establishes communications with the smart card using a common communication protocol. In 520, after establishing communications with the smart card, the gaming machine may receive a list of gaming applications available for execution on the smart card. The gaming machine may also send to the smart card gaming machine identification information such as a gaming machine serial number that allows the smart card to identify the capabilities of the gaming machine. Thus, when the smart card has received gaming machine identification information and identified the type of gaming machine, the smart card may send a list of available applications that are appropriate to the type gaming machine and may not send all of the gaming applications available on the smart card.

In some embodiments, in 525 and 530, the gaming machine may select one or more gaming applications available on the smart card and instruct the smart card to execute the selected applications. For instance, the gaming machine may request the smart card to execute a player tracking application and download player tracking data stored on the smart card and to execute a progressive game application. In some embodiments, these functions may be automatically performed by the smart card without an instruction from the gaming machine. In 535, the gaming machine may receive one or more gaming instructions from the smart card generated from gaming applications executing on the smart card. For instance, the smart card may notify the gaming machine that the player's game play has triggered a particular bonus game and request the gaming machine to execute a corresponding bonus game presentation on the gaming machine. The gaming instructions from the smart card may include player tracking information, loyalty points, paytables, game components, game configuration, game play history information, progressive game information, bonus game information and voucher information. In addition, the gaming instructions may allow the smart card to download a game or some other gaming application stored on the smart card and have it executed on the gaming machine.

In 538, in response to gaming instructions received from the smart card, the gaming machine may send gaming instructions to the smart card. For example, the gaming machine may send game play information generated on the gaming machine to the smart card. As another example, the gaming machine may send a gaming instruction requesting voucher information stored on the smart card. In 540, the gaming machine may present a game presentation using gaming instructions from the smart card. For instance, the gaming machine may present a bonus game presentation based upon a gaming instruction from the smart card requesting the gaming machine to present a bonus game presentation. In 545, when game play continues on the gaming machine as part of a game play sequence, combinations of 525, 530, 535, 538 and 540 may be repeated.

Figure 6:
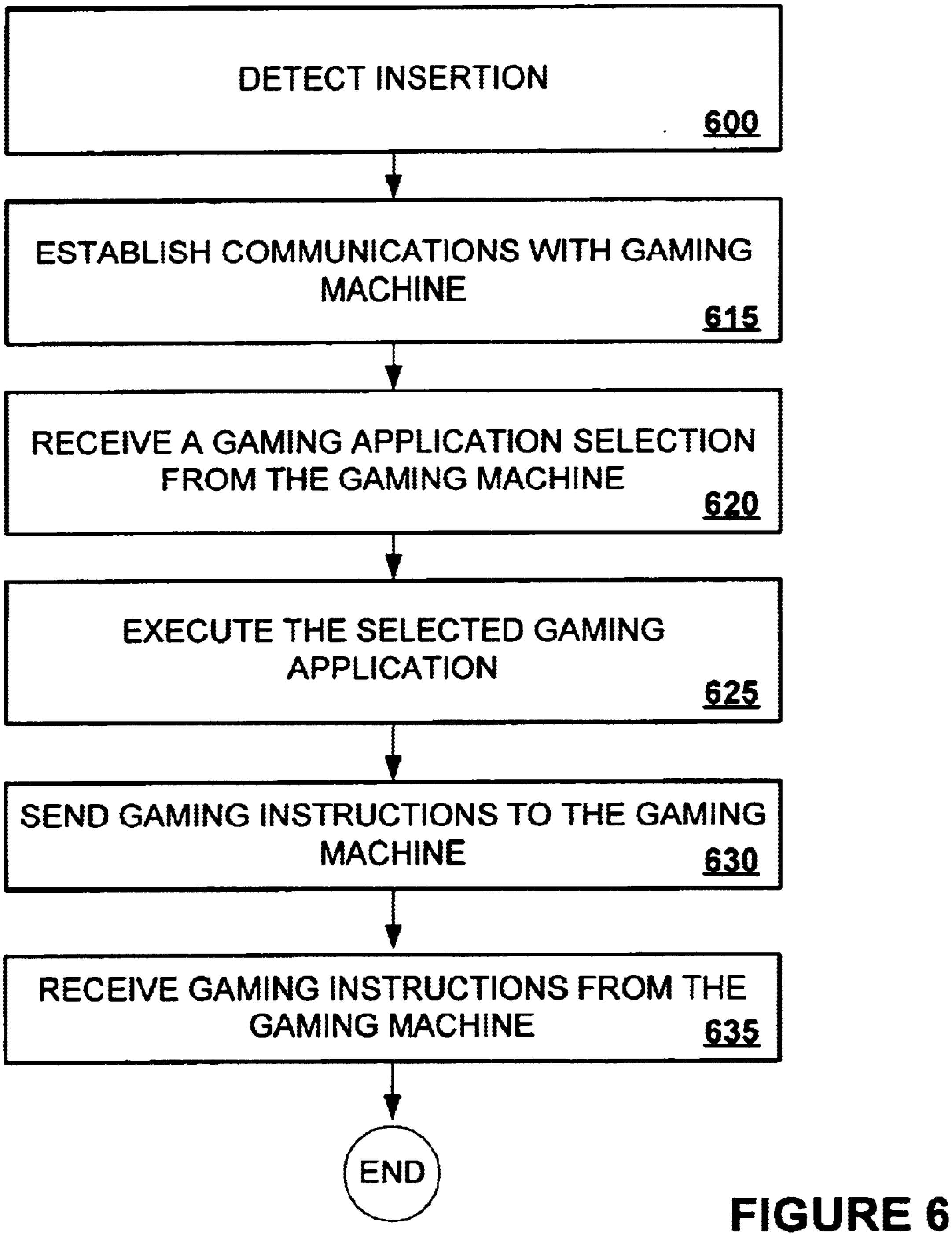
FIG. 6 is a flow chart depicting a method in a smart card for executing a game play on the gaming machine with the aid of a smart card.

FIG. 6 is a flow chart depicting a method in a smart card for executing a game play on a gaming machine with the aid of a smart card. In 600, the smart detects that it has been inserted into a smart card reader or some other communication interface device on the gaming machine. A validation process, such as the generation of a digital signature, may be executed by the smart card. In 615, the smart card establishes communications with the gaming machine using a common communication protocol of some type. In addition, the smart card may establish communication with a remote device such as a remote computer connected to the gaming machine via a network. The smart card may identify the type of gaming machine and send a list of gaming applications on the smart card that may be utilized with the gaming machine. In 620, the smart card may receive one or more gaming application selections from the gaming machine. In 625, the smart card may execute the selected gaming applications. Further, the smart card may automatically execute some gaming applications not selected by the gaming machine.

In 630, the smart card may send one or more gaming instructions to the gaming machine. The gaming instructions may contain information, programs or commands requesting the gaming machine to perform certain functions. In 635, in response to the gaming instructions sent to the gaming machine, the smart card may receive gaming instructions from the gaming machine. For instance, the smart card may receive game play information from game play on the gaming machine as part of a game play sequence. As a game play sequence unfolds on the gaming machine combinations of 620, 625, 630 and 635 may be repeated on the smart card.

Figure 7:
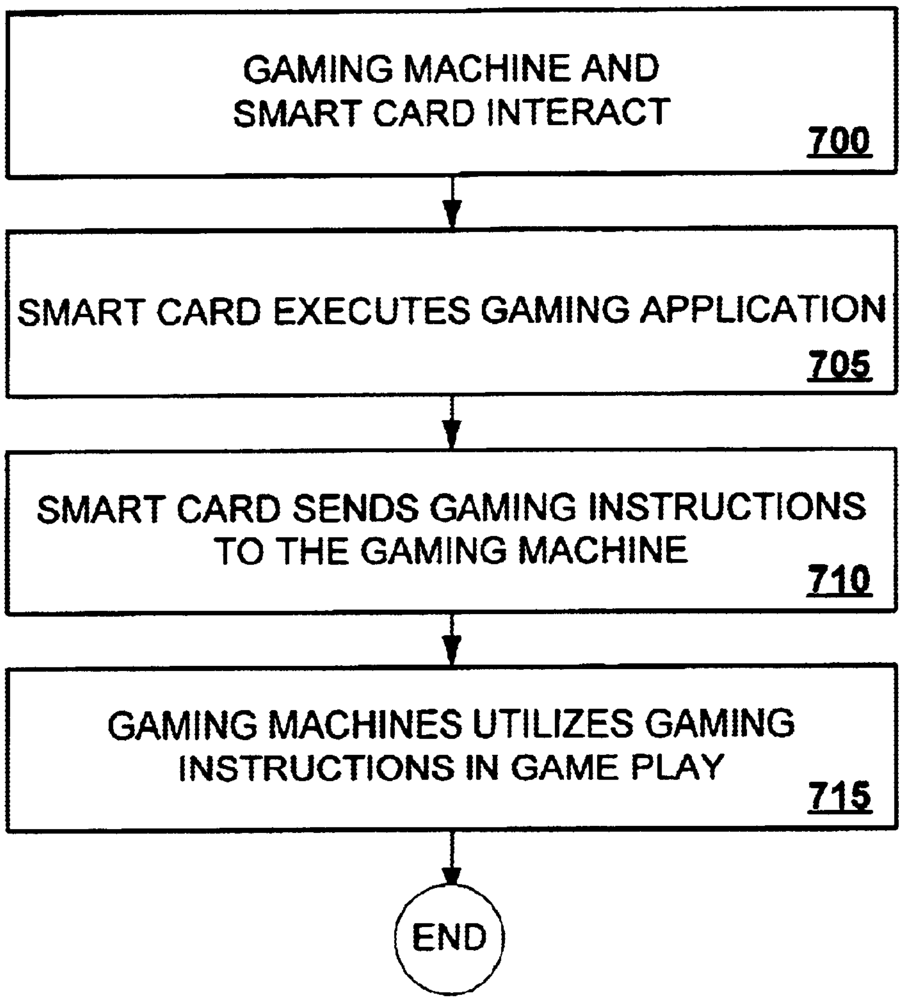
FIG. 7 is a flow chart depicting a method of distributed computing between a gaming machine and a smart card.

The methods described in FIGS. 6 and 7 may not be limited to a smart card interacting with a gaming machine. Similar method may be envisioned for any portable devices that may execute gaming applications. For instance, a PDA may interact with a gaming machine in a manner similar to the smart card. Thus, the PDA may execute gaming applications that generate gaming instructions and send the gaming instructions to the gaming machine using an appropriate conmnunication interface. The gaming instructions from the PDA may affect game play on the gaming machine. Also, the PDA may receive gaming instructions from the gaming machine. Further, smart cards or PDAs may be used with other gaming devices other than gaming machines such as game play terminals.

FIG. 7 is a flow chart depicting a method of distributed computing between a gaming machine and a smart card. In 700, the gaming machine and smart card interact. For example, a smart card is inserted into a smart card reader and communications are established between the gaming machine and the smart card. In 705, the smart card executes a gaming application using a processor on the smart card. In 710, the smart card sends gaming instructions generated during the execution of the gaming application to the gaming machine. The gaming instructions may contain information, commands or programs. In 715, the gaming machine utilizes the gaming instructions from the smart card for game play on the gaming machine.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A gaming machine for executing a game play with the aid of a smart card, the gaming machine comprising:

a master controller designed or configured to control a game of chance played on the gaming machine by executing game code that uses gaming instructions generated by a processor on the smart card wherein the gaming instructions generated by the processor include commands and/or data compatible with the game code executed by the master gaming controller, said master gaming controller including a first memory for storing the gaming instructions received from the smart card, a first processor, separate from the processor on the smart card, for executing the game code and a communication interface for allowing communications with the smart card and receiving the gaming instructions from the smart card;

the smart card operable to execute one more gaming applications to generate the gaming instructions, said smart card including: the processor for executing the gaming applications, an input/output interface for allowing communications with the master gaming controller and a second memory for storing the gaming applications executed by the processor;

a smart card reader providing a communication interface between said smart card and said master gaming controller;

an input mechanism, connected to and under control of the master gaming controller, for receiving cash or indicia of credit for wagers on the game of chance played on the gaming machine; and and an output mechanism, connected to and under control of the master gaming controller, for outputting cash or indicia of credits.

2. The gaming machine of claim 1, further comprising:

a network communication interface wherein the smart card communicates with a game service server using said network communication interface.

3. The gaming machine of claim 2, wherein the game service server is selected from the group consisting of an accounting server, a bonus game server, a progressive server, a player tracking server and a cashless system server.

4. The gaming machine of claim 1, wherein the gaming instructions generated by a processor on the smart card specify a progressive game that affects a game presentation on the gaming machine.

5. The gaming machine of claim 1, wherein the gaming instructions generated by a processor on the smart card specify a paytable used by the gaming machine in a game presentation.

6. The gaming machine of claim 1, further comprising:

a speaker.

7. The gaming machine of claim 6, wherein said speaker outputs audio components stored in a memory on said smart card.

8. The gaming machine of claim 1, further comprising a graphical display.

9. The gaming machine of claim 8, wherein said graphical display outputs graphical components stored in a memory on said smart card.

10. The gaming machine of claim 1, wherein the gaming instructions generated by a processor on the smart card specify a bonus game that affects a game presentation on the gaming machine.

11. The gaming machine of claim 1, wherein the game is selected from the group consisting of a video black jack game, a video slot game, a mechanical slot game, a video poker game, a video keno game, a video pachinko game and a video card game.

12. In gaming machine, a method for executing a game play on the gaming machine with the aid of a smart card, the method comprising:

receiving a signal indicating a smart card has been inserted in a smart card reader on the gaming machine wherein the signal is received in a master gaming controller designed to control a game of chance played on the gaming machine;

establishing communications, under control the master gaming controller, with said smart card;

receiving, under control of a master gaming controller, first gaming instructions from at least one of a plurality of gaming applications executed by a processor on the smart card wherein the first gaming instructions generated by the processor include commands and/or data compatible with game code for controlling the game of chance that is executable by the master gaming controller;

storing the first gaming instructions on a memory device on the master gaming controller;

receiving a wager on a game of chance; and executing game code, under control of the master gaming controller, to generate generating the game of chance on the gaming machine using the first gaming instructions provided the smart card.

13. The method of claim 12, further comprising:

authenticating the smart card.

14. The method of claim 12, further comprising:

receiving a list of gaming applications available on the smart card from the smart card.

15. The method of claim 14, further comprising:

selecting a gaming application from the list of gaming applications and requesting the smart card to execute the selected gaming application.

16. The method of claim 12, further comprising:

sending gaming machine identification information to the smart card.

17. The method of claim 12, wherein the fist gaming instructions include at least one of player tracking information, loyalty points, paytables, game components, game configuration information, a game play history, progressive game information, bonus game information, voucher information and combinations thereof.

18. The method of claim 17, wherein the game component includes at least one of a graphical game component and an audio game component.

19. The method of claim 17, wherein the game configuration information is selected from the group consisting of a game type, a game version, a game background, a game denomination and a game wager amount.

20. The method of claim 12, further comprising:

in response to the first gaming instructions received from the smart card communicating with a remote game server.

21. The method of claim 12, further comprising:

sending game play information to the smart card.

22. The method of claim 12, wherein the game play is for a video black jack game, a video slot game, a mechanical slot game, a video poker game, a video keno game, a video pachinko game and a video card game.

23. The method of claim 12, further comprising:

downloading a gaming application stored on the smart card and executing said gaming application on the gaming machine.

24. The method of claim 12, further comprising:

downloading a game stored on the smart card and executing said game on the gaming machine.

25. The method of claim 24, wherein the game is a pull tab game.

* * * * *

UNITED STATES PATENT AND TRADEMARK OFFICE

CERTIFICATE OF CORRECTION

PATENT NO. : 6,852,031 B1 
DATED : February 8, 2005
INVENTOR(S) : Richard E. Rowe It is certified that error appears in the above-identified patent and that said Letters Patent is hereby corrected as shown below:

<u>Title page,</u>
Item [54], Title, please change "EZ PAY SMART CARD AND TICKETS SYSTEM" to -- EZ PAY SMART CARD AND TICKET SYSTEM --

<u>Column 23,</u>
Line 54, after "In" add -- a --

<u>Column 24,</u>
Line 16, after "provided" add -- from --
Line 29, change "fist" to -- first --

Signed and Sealed this

Tenth Day of May, 2005

JON W. DUDAS
*Director of the United States Patent and Trademark Office*